United States Patent [19]

Berger

[11] Patent Number: 4,586,364
[45] Date of Patent: May 6, 1986

[54] QUICK-CHANGE TRANSFER HEAD

[75] Inventor: James R. Berger, Tiffin, Ohio

[73] Assignee: The National Machinery Company, Tiffin, Ohio

[21] Appl. No.: 400,277

[22] Filed: Jul. 21, 1982

[51] Int. Cl.⁴ .............................................. B21J 13/08
[52] U.S. Cl. ...................................... 72/405; 72/422;
10/12 T; 10/76 T; 403/381
[58] Field of Search .................. 72/405, 422, 481;
10/12 T, 72 T, 76 T, 11 T; 414/750; 403/381,
331, 374, 409

[56] References Cited

U.S. PATENT DOCUMENTS

| Re. 11,318 | 3/1893 | Moltrup | 72/481 |
|---|---|---|---|
| 197,667 | 11/1877 | Roberts | 403/331 |
| 386,755 | 7/1888 | O'Brien | 72/481 |
| 2,127,285 | 8/1938 | Brecht | 403/331 |
| 2,832,246 | 4/1958 | Livermont | 403/331 |
| 3,165,766 | 1/1965 | Wisebacker | 72/405 |
| 3,317,647 | 5/1967 | Bosold | 403/381 |
| 3,422,657 | 1/1969 | Grombka et al. | 72/405 |
| 3,559,446 | 2/1971 | Dom et al. | 72/405 |
| 3,604,242 | 9/1971 | Allebach et al. | 72/421 |
| 3,811,785 | 5/1974 | Hagglund | 403/374 |
| 3,965,718 | 6/1976 | Kline | 72/405 |
| 4,351,180 | 9/1982 | Allebach | 72/405 |

FOREIGN PATENT DOCUMENTS

| 1140763 | 8/1957 | France | 403/331 |
|---|---|---|---|
| 2041146 | 9/1980 | United Kingdom | 403/381 |

Primary Examiner—Daniel C. Crane
Attorney, Agent, or Firm—Pearne, Gordon, Sessions, McCoy, Granger & Tilberry

[57] ABSTRACT

A transfer system for forging machines or the like is disclosed in which a transfer assembly is cantilever-mounted on a powered support for easy removal and replacement, e.g., to provide access to the forging machine dies. Mounting means including mating surfaces on the support and the transfer assembly, which, when engaged, position the transfer assembly with respect to the support. Such surfaces are contained in at least three mutually perpendicular planes. A wedge operated by a piston and cylinder actuator operates in one position to lock the transfer assembly on the support and, when retracted, permits removal of the transfer assembly by vertical movement. The mounting means is arranged to provide locating surfaces and cam surfaces which assist the operator in guiding the transfer assembly to its mounted position.

7 Claims, 7 Drawing Figures

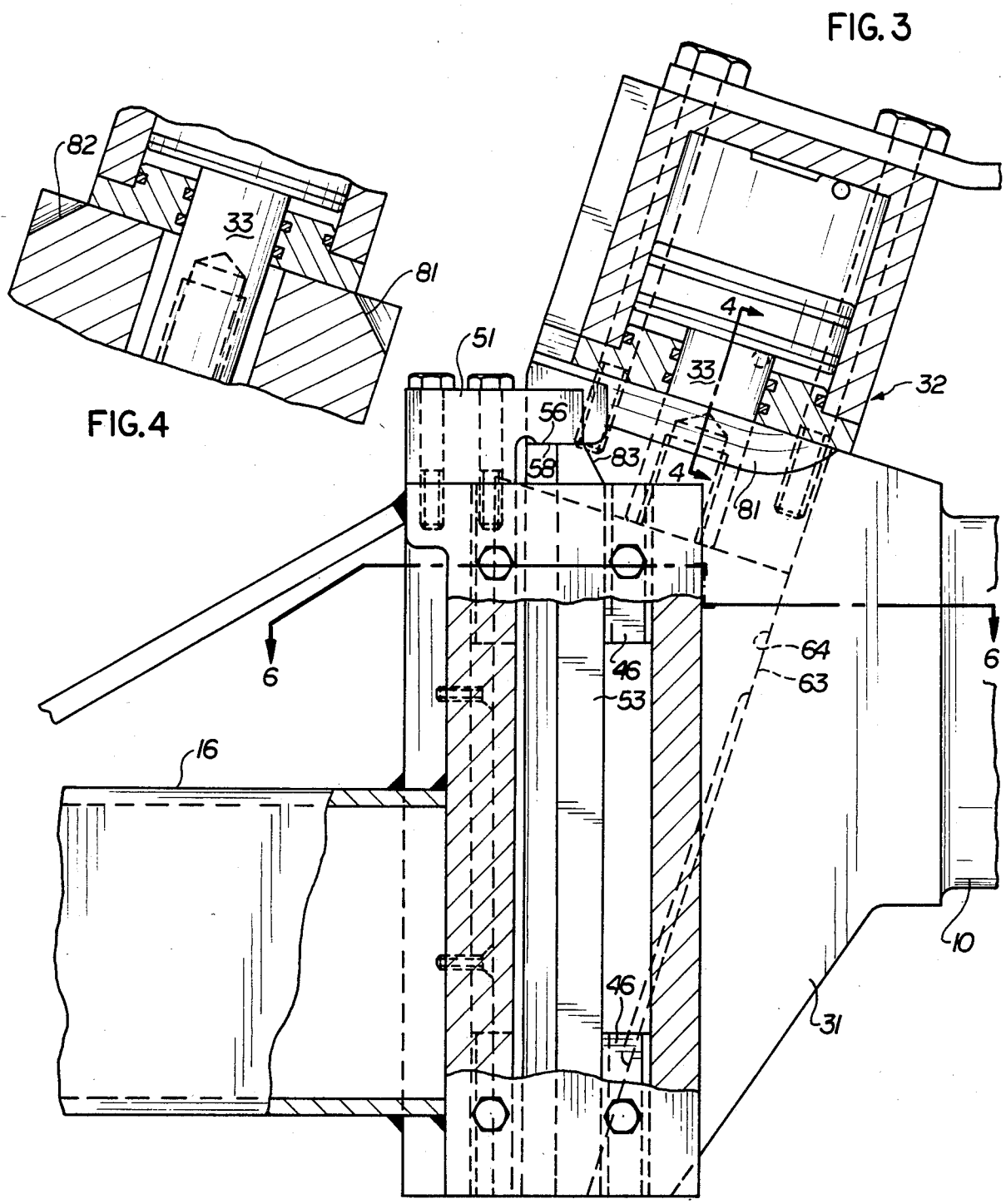

QUICK-CHANGE TRANSFER HEAD

BACKGROUND OF THE INVENTION

This invention relates generally to workpiece transfers for forging machines and the like, and more particularly to a novel and improved mounting system which facilitates easy removal and replacement of such a transfer.

PRIOR ART

Progressive forging machines generally provide automatic transfers which progressively move workpieces from one work station to the next. Such transfers are generally mounted in an operative position in which they limit access to the work area. Examples of such transfers are illustrated in U.S. Pat. Nos. 3,165,766; 3,422,657; 3,604,242; and 3,965,718.

In some instances, such transfers are mounted on a support or frame which can be pivoted out of the operative position to improve access to the work area of the machine. An example of such transfer is illustrated in U.S. Pat. No. 3,604,242.

It is also known to provide a separate transfer gripping assembly which is set up for a particular job at a location removed from the machine and is thereafter installed in the machine as an adjustment transfer assembly. An example of such a system is illustrated in U.S. Pat. No. 3,559,446. All of the above-cited patents are assigned to the assignee of the present invention.

SUMMARY OF THE INVENTION

This invention provides a novel and improved mechanism for forging machines and the like which can be easily removed from the machine and subsequently replaced in the machine. Such mechanism, in the illustrated embodiment, provides a powered wedge which operates when retracted to allow the transfer assembly to be lifted out of the machine. Removal of the transfer assembly provides sufficient access to the die area of the machine to permit easy removal and replacement of the dies. After the dies have been serviced, the transfer assembly is easily reinstalled in position and is locked in such position by the simple operation of extending the wedge.

The particular embodiment illustrated is applied to a transfer disclosed and claimed in U.S. Pat. No. 3,965,718 in which the transfer gripping assembly is cantilever-mounted on a support and drive system mounted to one side of the work area. Such transfers are typically used in hot forging machines since the support and drive system is located to one side of the work area and is protected from heat and scale. Such patent is incorporated by reference for the disclosure of the overall system.

The clamping mechanism which permits removal and reinstallation of the transfer assembly is provided with camming or guide surfaces which assist in properly locating the transfer assembly as it is moved into position during installation. Consequently, the installer merely has to position the transfer assembly in roughly the proper position and the camming surfaces then operate to complete the proper positioning of the transfer assembly as it is lowered into the installed position for final clamping.

With this invention the installation or removal of the transfer assembly is accomplished easily and quickly even on very large machines having very heavy transfer assemblies normally handled with the aid of a power crane or the like.

With the present invention, it is not necessary for the operator or installer to attempt to work in a confined die area, nor is it necessary for the operator or installer to attempt to work in a die area which may, in many cases, be quite hot for a considerable period of time after the machine is stopped.

These and other aspects of this invention are more fully described in the following specification and are illustrated in the attached drawings.

BRIEF DESCRIPTION OF THE DRAWINGS

FIG. 3 is an enlarged, fragmentary section of the clamping system for removably mounting the transfer on the support member;

FIG. 4 is a fragmentary section, taken generally along line 4—4 of FIG. 3;

DETAILED DESCRIPTION OF THE DRAWINGS

Figure 5:
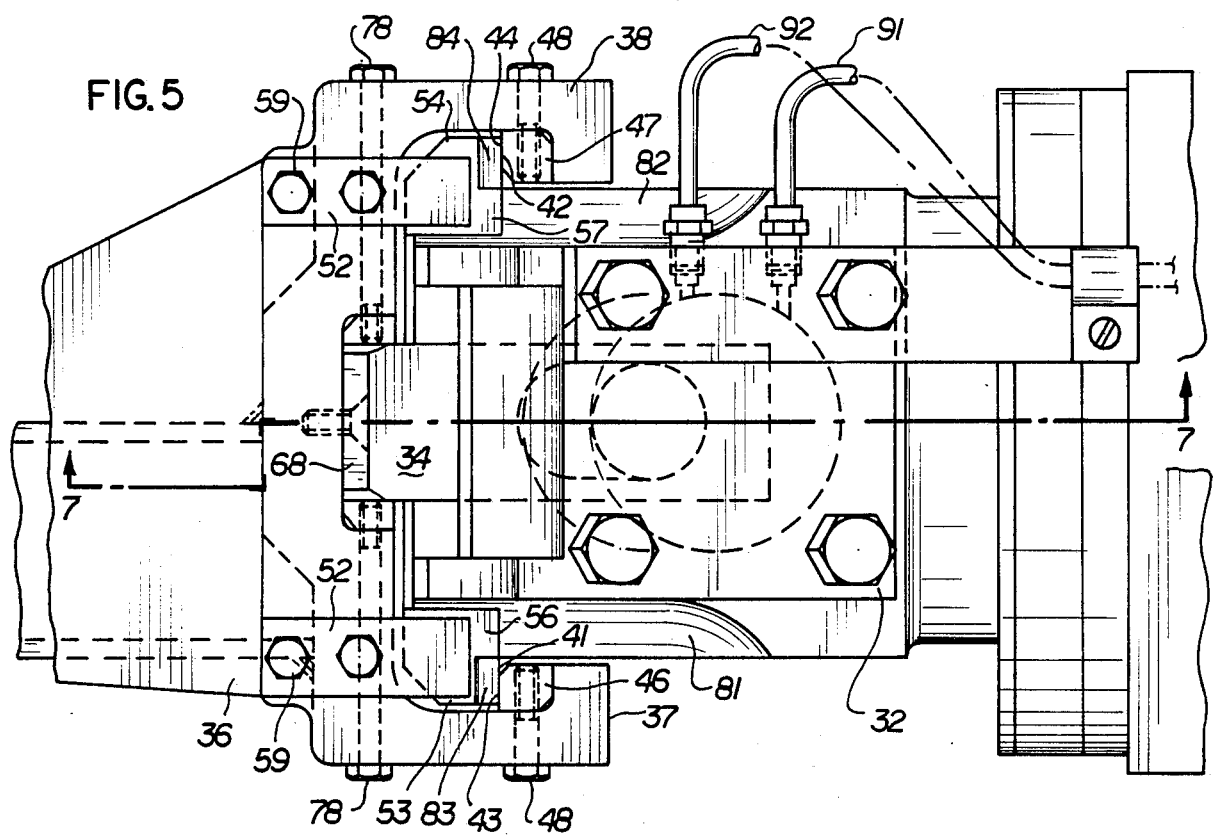
FIG. 5 is an enlarged, fragmentary plan view of the mounting system.

The present invention is illustrated as applied to the transfer support and powering system disclosed in FIG. 5 of U.S. Pat. No. 3,965,718, and such figure, along with the corresponding description contained within the specification, are incorporated by reference to describe the structure and mode of operation of the basic transfer system.

In such system, there are two support members 10 and 11 located in vertical alignment. These members are movable toward and away from each other for purposes of gripping and releasing workpieces, and are axially movable while in the workpiece-gripping position to move the workpiece-gripping fingers and the workpieces gripped thereby from one work station to the next. In order to simplify understanding of this invention, the actual gripping fingers or devices are not illustrated because such gripping devices are well known to persons skilled in the art.

The transfer operates through a cycle in which the two support members 10 and 11 move toward each other to a position in which they are parallel and grip a workpiece being ejected from the dies, such as the dies 12, 13, 14, and 15. While the two members are in the closed or gripping position illustrated, in which they are parallel and closed, the members extend axially, carrying the workpiece from one die station, such as the die station 12, to the die station 13, and from the die station 13 to the die station 14, etc. Once the workpiece is positioned in alignment with the subsequent die station, the tooling of the machine engages the workpiece, pushing it into the die. As such action occurs, the two support members 10 and 11 move apart to clear the tooling and to release the workpiece. While the support members, and in turn the grippers supported thereby, are moved apart, the support members again move axially, but this time in the opposite direction, back to a position in which they can close and grip workpieces for the next cycle of operation.

Figure 1:
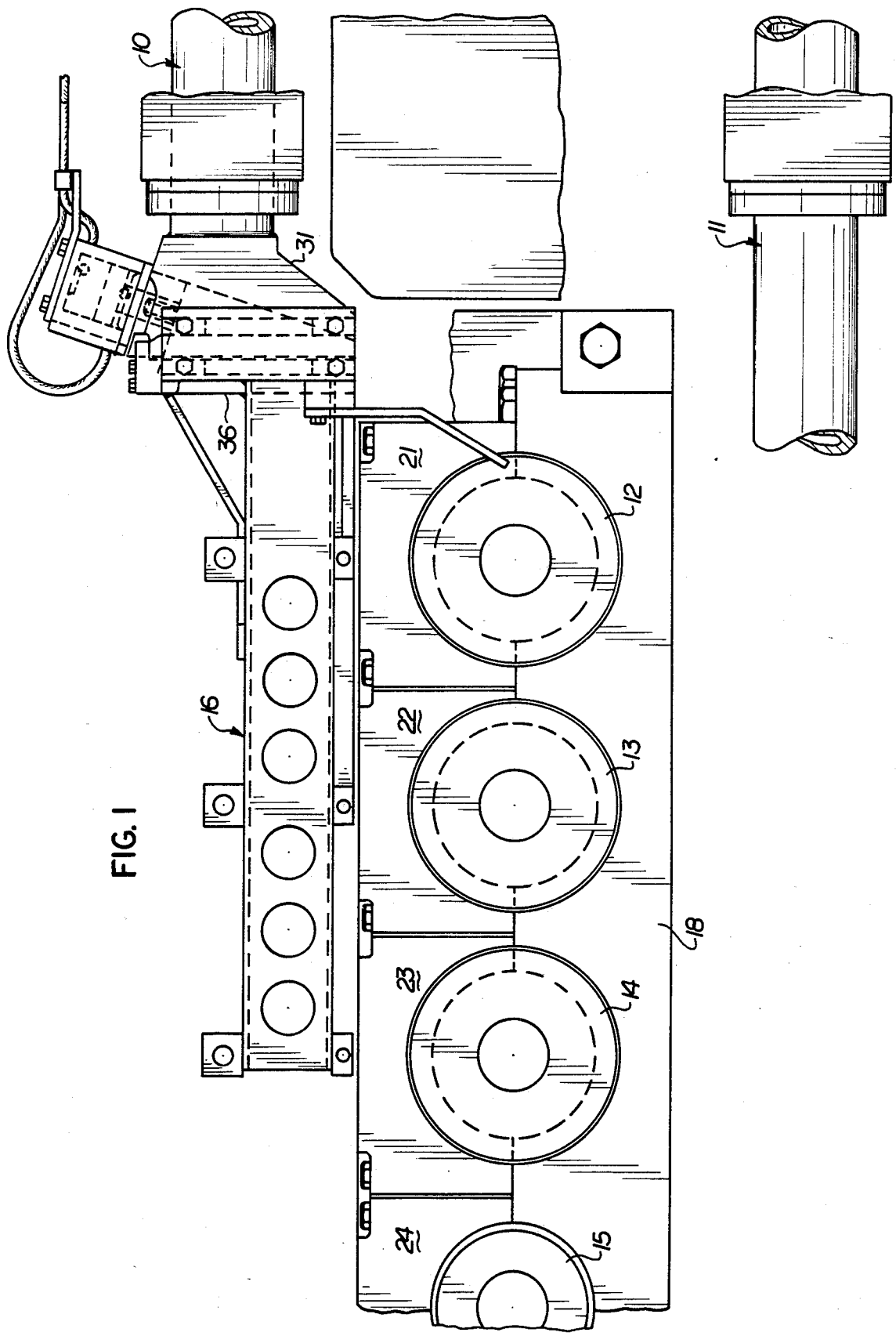
FIG. 1 is a fragmentary side elevation of a transfer mechanism incorporating a preferred form of this invention, with parts removed for purposes of clarity.
Figure 2:
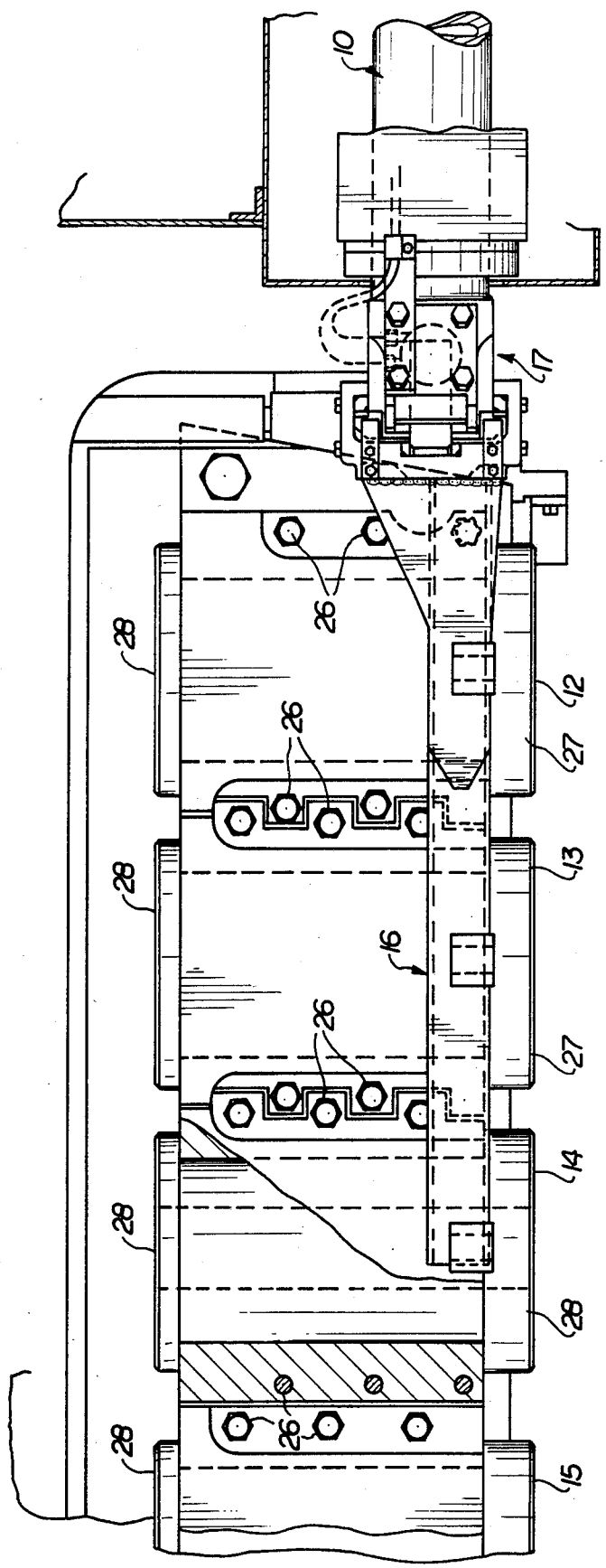
FIG. 2 is a plan view of the transfer mechanism illustrated in FIG. 1, partially in section, to illustrate the die mounting structure.

In the illustrated embodiment, a transfer assembly 16 is demountably supported on the upper support member 10 by a mounting mechanism 17 so that the transfer assembly 16 is cantilever-mounted at one end on the support member 10 and extends over the dies 12 through 14 and is movable to a position over the die 15. As best illustrated in FIG. 2, the dies 12-15 are provided with flanges at both ends and are removably mounted on the die breast 18. Die caps 21 through 24, respectively fit over the dies 12 through 15 and are secured in place by bolts 26 when the dies are mounted. However, because the dies have front and rear flanges 27 and 28, respectively, it is necessary to completely remove the die caps and to then remove the dies by vertical upward movement when it is necessary to change the dies. The demountable mounting of the transfer assembly 16 is therefore used to provide access and clearance for removal and replacement of the dies. The mounting mechanism 17 is therefore arranged so that the transfer assembly 16 can be easily removed to provide access to the dies, and then easily and quickly replaced after the die maintenance has been completed.

The structural detail of the mounting mechanism 17 is best illustrated in FIGS. 3 through 7, and reference should now be made to those figures. The support member 10 is provided with a mounting head 31 having a fluid pressure-operated piston and cylinder actuator assembly 32 mounted thereon. The piston 33 is connected to a wedge 34 and operates to extend and retract the wedge to lock and release the transfer assembly 16 on the end of the support member 10. A yokelike mounting assembly 36 in the mounting position illustrated provides a pair of opposed arms 37 and 38 between which the forward end of the mounting head 31 extends. The forward end of the mounting head 31 is provided with a pair of laterally spaced, rearwardly facing surfaces 41 and 42 which extend perpendicularly to the longitudinal axis of the transfer and mate with forwardly facing mating surfaces 43 and 44 on the arms 37 and 38, respectively. Preferably, the surfaces 43 and 44 are provided by bearing blocks 46 and 47, secured to the arms 37 and 38 by bolts 48. Such mounting blocks are accurately ground to the proper dimension for accurately determining the longitudinal position of the transfer assembly 16 with respect to the support member 10, when the wedge 34 locks the mounting mechanism.

The vertical position of the transfer assembly 16 is determined by engagement between cap members 51 and 52 with the upper ends of the flange portions 53 and 54, respectively. The flange portions extend in opposite directions from the mounting head 31 and provide the rearwardly facing surfaces 41 and 42 and upper end surfaces 56 and 57, which are respectively engaged by downwardly facing surfaces 58 provided on the caps 51 and 52. The caps 51 and 52 are removably mounted on the mounting head by bolts 59 so that they can be ground to properly position the surfaces 58 for engagement with the surfaces 56. In the illustrated embodiment, the surfaces 58, which mate respectively with the surfaces 56 and 57 formed on the ends of the flanges 53 and 54, are preferably contained in a plane which, in the illustrated embodiment, extends horizontally, and when they engage they accurately determine the vertical position of the transfer assembly.

Figure 6:
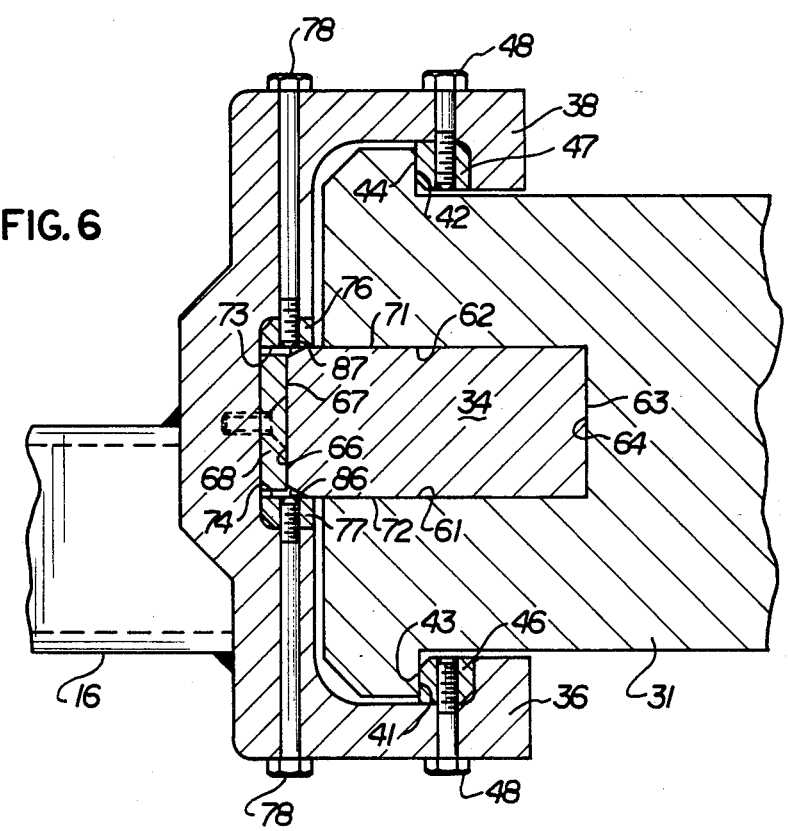
FIG. 6 is a fragmentary section, taken along line 6—6 of FIG. 3.
Figure 7:
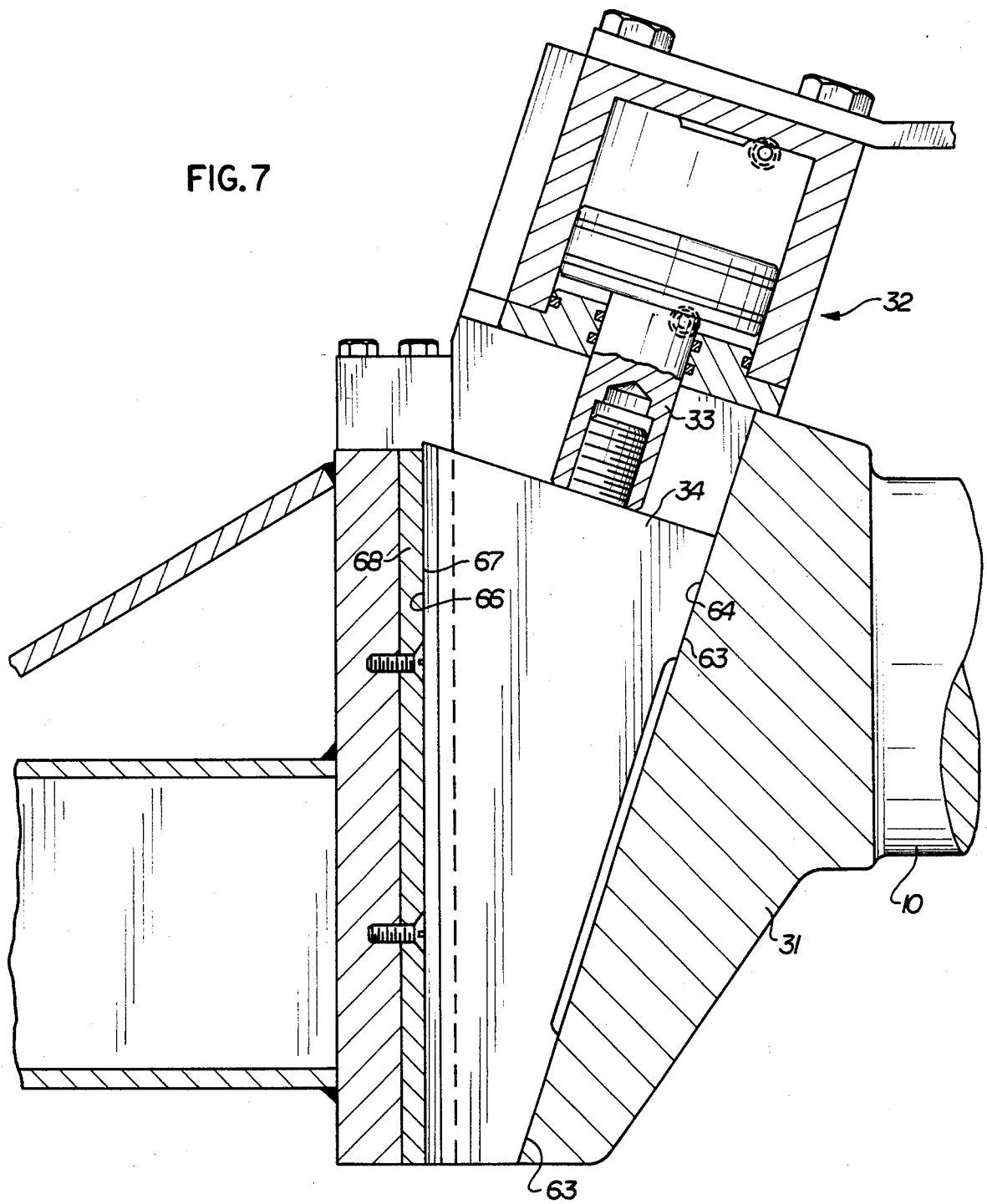
FIG. 7 is a fragmentary section, taken generally along line 7—7 of FIG. 5.

The wedge 34 is positioned laterally between parallel faces 61 and 62 formed in the body of the head 31 by a groove best illustrated in FIG. 6. The rearward side 63 of the wedge 34 engages an inclined surface 64 formed in the head 31, as best illustrated in FIGS. 6 and 7, As best illustrated in FIGS. 3 and 7, the actuator 32 is mounted in an inclined position so that the piston 33, which operates the wedge, moves along an axis parallel to the inclined surface 64.

The forward face 66 of the wedge 34 extends normal to the axis of the transfer and is movable into and out of engagement with a rearwardly facing surface 67 provided by a bearing block 68 mounted on the transfer assembly. When the wedge 34 is driven down to the illustrated locking position, the interengagement between the two surfaces 66 and 67 produces an axial force, causing the mating surfaces 41 and 43 and 42 and 44 to tightly engage, and operates to lock the transfer assembly 16 on the head 13.

Lateral alignment in a horizontal plane is achieved by engagement of the opposed side faces 71 and 72 of the wedge (see FIG. 6) with opposed axially extending faces 73 and 74 provided by removable bearing plates 76 and 77, respectively. Here again, the bearing plates are removably mounted with bolts 78 so that they can be accurately ground to provide a good fit with the wedge 34 and to provide accurate lateral positioning of the transfer assembly in a horizontal plane.

The various mating positioning surfaces are contained in three mutually perpendicular planes, so the transfer assembly is accurately positioned with respect to the support member when such surfaces engage. For example, the mating surfaces 41 and 43 constitute one pair of surfaces and cooperate with the pair of surfaces provided by the mating surfaces 42 and 44 to accurately locate the transfer assembly in a longitudinal direction. Similarly, the pair of faces or surfaces 71 and 73 are opposed to the pair of faces 72 and 74, and are located in longitudinally extending planes to precisely position the transfer assembly in its proper lateral position. Similarly, vertical position is accurately determined by the pairs of mating surfaces 56 and 58, and 57 and 56.

It should be understood that it is preferable to locate these mating surfaces so that they extend along planes which are mutually perpendicular; however, it should also be understood that proper positioning does not require that such planes be exactly perpendicular or, for that matter, that various corresponding pairs be located in the exact, same plane.

Normally, the transfer assembly is handled by a power lift mechanism, such as a power crane or the like. In order to facilitate the reinstallation of the transfer assembly, the mounting mechanism is provided with camming surfaces which automatically align the various parts as the transfer assembly is lowered into position. For example, the mounting head body 31 is formed with inclined camming surfaces 81 and 82 (best illustrated in FIGS. 3, 4, and 5) which extend inwardly to the sides of the cylinder of the actuator 32. Therefore, when the operator is lowering the transfer assembly into its installed position, he merely positions the two arms 37 and 38 on opposite sides of the cylinder, and as the assembly is lowered, the lower ends of the arms engage the camming surfaces 81 or 82, which function to move the arms laterally until they are properly laterally positioned on opposite sides of the head 31. Similarly, the upper end of the flanges 53 and 54 are formed with camming surfaces 83 and 84, which are engaged by the lower ends of the lower bearing blocks 46 and 47 to cam the transfer assembly rearwardly if it is not already in its proper position for the bearing blocks to fit down along the sides of the flanges. The arms provide rough lateral positioning, and the forward end of the wedge 34 is provided with camming surfaces 86 and 87 which operate as the wedge is driven downwardly by the piston 33 to provide the final lateral positioning of the transfer assembly. Because of the cooperation of the various camming surfaces, the operator need only achieve rough positioning by positioning the ends of the arms 37 and 38 on opposite sides of the cylinder of the actuator 32 as the transfer assembly is lowered into position. The final accurate positioning of the parts is achieved automatically by the camming surfaces. Suitable pressure lines 91 and 92 connect to the ends of the actuator 32 through a suitable control valve so that the wedge can be retracted or extended by the operator.

To remove the transfer assembly 16, it is merely necessary to retract the wedge and lift the assembly vertically in the case of the illustrated embodiment up out of the machine. For reinstallation, the transfer assembly is then lowered into rough position and then, under the influence of the various camming surfaces, precisely positioned for extension of the wedge. When the wedge is driven down by the piston, all of the various mating surfaces are locked together and remounting of the transfer assembly is completed by the mere operation of the actuator to extend the wedge to the illustrated position.

Because the cylinder is mounted on the support member, removal of the transfer assembly does not require that any of the supply lines be disconnected. It is necessary, however, to provide flexible lines to the cylinder so that the movement of the support member can be accommodated.

Although the present invention is illustrated in a machine in which the transfer assembly must be removed to permit the removal and servicing of the dies, this invention, in its broader aspects, can be employed wherever quick-change tooling is required. For example, a given transfer assembly can be set up to handle a particular part on a jig remote from the machine and, during the tool changeover, installed to replace a transfer assembly set up to handle a different type of part.

Although the preferred embodiment of this invention has been shown and described, it should be understood that various modifications and rearrangements of the parts may be resorted to without departing from the scope of the invention as disclosed and claimed herein.

What is claimed is:

1. A demountable transfer for forging machines and the like comprising a powered movable transfer support, an elongated transfer assembly, and mounting means releasably securing said assembly on said support, said mounting means including substantially planar surfaces carried by said assembly and support which are engageable to locate said assembly in a predetermined fixed position relative to said support, and a single power-operated locking wedge operable to releasably secure said surfaces in engagement, said surfaces being located for removal of said assembly when said locking wedge is released by movement of said assembly in a first direction and replacement of said assembly by movement thereof in the opposite direction, said surfaces including support surfaces and mating assembly surfaces, said support surfaces extending along three planes which are substantially mutually perpendicular to each other, said locking wedge providing opposed substantially parallel surfaces which cooperate with mating surfaces on said transfer assembly to provide at least two pair of engaging surfaces to lock said transfer assembly against lateral movement relative to said transfer support from said predetermined fixed position, said mounting means including locating means operable to guide said assembly to said predetermined fixed position as said assembly is moved in said opposite direction.

2. A demountable transfer as set forth in claim 1, wherein said wedge is powered by a piston and cylinder actuator mounted on said support and connected to operate said wedge.

3. A demountable transfer as set forth in claim 2, wherein said actuator provides at least some of said locating means and said locating means includes inclined camming surfaces.

4. A demountable transfer as set forth in claim 1, wherein said assembly is elongated and is cantilever-mounted on said support, said mounting means including a yoke on one of said support and said assembly, and the other of said support and said assembly extends into said yoke.

5. A demountable transfer as set forth in claim 1, wherein said assembly when mounted extends horizontally and said first direction is vertical.

6. A demountable transfer as set forth in claim 5, wherein said forging machine or the like includes a plurality of dies which are installed and replaced by vertical movement, said support is supported at a location at one side of said dies, and when mounted on said support said assembly extends over said dies, removal of said assembly providing access to said dies for the removal and replacement thereof.

7. A demountable transfer for forging machines and the like in which an elongated transfer assembly is cantilever-mounted on a movable support comprising a mounting head on said support providing first longitudinally facing surfaces, first opposed laterally facing surfaces, and first vertically facing surfaces, said first surfaces being substantially planar and generally perpendicular to each other, said transfer assembly providing second longitudinally facing surfaces engageable with said first longitudinally facing surfaces and operable when engaged to longitudinally position said transfer assembly with respect to said support, second opposed surfaces engageable with said first opposed laterally facing surfaces and operable when engaged to laterally position said transfer assembly with respect to said support, and second vertically facing surfaces engageable with said first vertically facing surfaces and operable when engaged to vertically position said transfer assembly relative to said support, and a power-operated wedge on said transfer assembly operable to releasably lock said respective surfaces together for mounting said transfer assembly on said support, release of said wedge permitting removal and replacement of said transfer assembly by vertical movement of said transfer assembly with respect to said support, said wedge providing said first opposed laterally facing surfaces whereby said wedge establishes the lateral position of said transfer assembly relative to said mounting head, said support and said elongated transfer assembly providing locating means operable to guide said transfer assembly to both the longitudinal position and the lateral position determined by said first longitudinal facing surfaces and said second opposed surfaces.

* * * * *